(12) United States Patent
Chen

(10) Patent No.: US 9,121,537 B2
(45) Date of Patent: Sep. 1, 2015

(54) WATER OUTFLOW DEVICE

(76) Inventor: Ming Hung Chen, Taichung (TW)

(*) Notice: Subject to any disclaimer, the term of this patent is extended or adjusted under 35 U.S.C. 154(b) by 180 days.

(21) Appl. No.: 13/591,241

(22) Filed: Aug. 22, 2012

(65) Prior Publication Data

US 2013/0049351 A1    Feb. 28, 2013

(30) Foreign Application Priority Data

Aug. 24, 2011 (TW) .............................. 100215783 A

(51) Int. Cl.
| F16L 37/28 | (2006.01) |
| F16K 51/00 | (2006.01) |
| F16L 37/40 | (2006.01) |
| E03C 1/02 | (2006.01) |
| E03C 1/04 | (2006.01) |
| E03C 1/042 | (2006.01) |
| F16K 43/00 | (2006.01) |

(52) U.S. Cl.
CPC ................ *F16L 37/40* (2013.01); *E03C 1/021* (2013.01); *E03C 1/042* (2013.01); *E03C 1/0403* (2013.01); *F16K 43/006* (2013.01)

(58) Field of Classification Search
CPC .................................. F16L 37/40; F16L 29/02
USPC .......... 251/149.1, 149.6, 149.9, 155; 285/361, 285/396, 402
See application file for complete search history.

(56) References Cited

U.S. PATENT DOCUMENTS

| 2,305,841 | A | * | 12/1942 | Carlson ...................... 251/149.6 |
| 2,457,052 | A | * | 12/1948 | Le Clair ................... 137/614.04 |
| 3,704,002 | A | * | 11/1972 | Skarzynski ................ 251/149.6 |
| 7,093,612 | B2 | * | 8/2006 | Greene et al. ............ 137/533.11 |
| 7,419,135 | B2 | * | 9/2008 | Chang ........................ 251/149.6 |

* cited by examiner

*Primary Examiner* — William McCalister
*Assistant Examiner* — Hailey K Do

(57) ABSTRACT

A water outflow device includes a joint and an outflow component. The joint includes a connector, sleeve, plunger, and a spring. The connector having a through hole is threaded to a house pipe and a threaded port of the sleeve respectively. The sleeve has a connection port on an opposite end against the threaded port. The plunger is movable between a close position and an open position so as to link or isolate the through hole of the connector and the connection port of the sleeve. The spring arranged inside the connector serves to push the plunger to maintain the plunger in the close position. The outflow component has a buckle portion, seal portion, and a push portion. The buckle portion is separably arranged to the connection port of the sleeve. The seal portion is extending from the buckle portion.

10 Claims, 10 Drawing Sheets

WATER OUTFLOW DEVICE

FIELD OF THE INVENTION

The present invention relates to water outflow devices, and particular to an outflow device which the installation is fast and easy without spouting out water during installation.

DESCRIPTION OF THE PRIOR ART

Referring to FIG. 1, a prior outflow component 10 such as a faucet, shower nozzle, or triangle valve mainly has a threaded end 11. To arrange the outflow component 10 to a house pipe 12, the regulator of the house pipe must be shut in advance. The threaded end 11 wound by a seal tape 13 is threaded into a water outlet 14 of the house pipe 12. Finally, the house pipe 12 can be opened to test the outflow component 10.
However, the regulator of the house pipe 12 is usually away from the outflow component 10. A lot of time will be spent on moving back and forth between the outflow component and the regulator. Sometimes the regulator or the main valve of the house is hard to locate or even not equipped in the house for some old design, user might need to reach the regulator located outside the house, on the roof, or in the basement. Obviously, it could cause more trouble for the installation of the outflow device. Moreover, the use of the seal tape 13 for the threaded end 11 needs some skills. An uneven arrangement of the seal tape 13 could cause leaking to the connection. Especially for threading the threaded end 11 with the seal tape 13 into the outlet 14, few practices are needed for amateur. Therefore, the installation of the outflow device is not easy and convenient to the general public.

SUMMARY OF THE PRESENT INVENTION

Accordingly, the primary object of the present invention is to provide a water outflow device which is easy to install by a simple insertion and twist.
To achieve above object, the preset invention includes a joint and an outflow component. The joint includes a connector, sleeve, plunger, and a spring. The connector is threaded to a house pipe and the sleeve respectively. The sleeve has a connection port for connecting the outflow component. The plunger is movable between a close position and an open position so as to link or isolate a through hole of the connector and the connection port of the sleeve. The spring arranged inside the connector serves to push the plunger to maintain the plunger in the close position. The outflow component has a buckle portion, seal portion, and a push portion. The buckle portion is separably arranged to the connection port of the sleeve. The seal portion is extending from the buckle portion. The push portion extending from the seal portion has an inlet on an end thereof. The push portion will push the plunger to the open position and the seal portion will isolate the through hole of the connector from the connection port of the sleeve while the buckle portion is arranged to the connection port, and the inlet of the push portion will link to the through hole of the connector

DETAILED DESCRIPTION OF THE INVENTION

Figure 1:
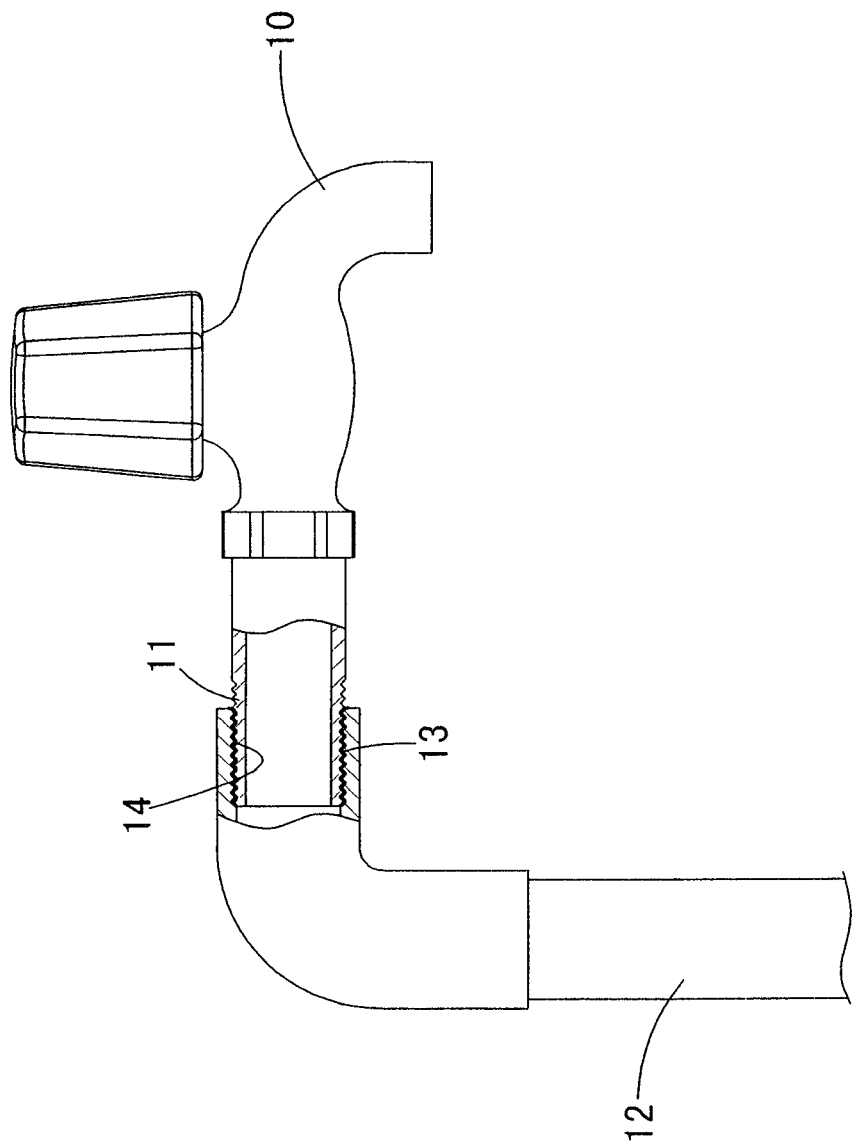
FIG. 1 is a cross-section view showing a prior water outflow device.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.
Referring to FIGS. 2 to 7, a preferable embodiment of the present invention is illustrated. The water outflow device mainly includes a joint 20 and an outflow component 30.
The joint 20 includes a connector 21, sleeve 22, first seal 23, plunger 24, spring 25, and a second seal 26.
The connector 21 has a first thread 210 and a second thread 211 on the two opposite ends thereof. A handle 212 with a larger diameter is formed between the first and the second threads 210 and 211. The first thread 210 serves to be threaded into a water outlet 41 of a house pipe 40 with a seal tape wound around the first thread 210. The handle 212 for fastening the connector 21 is hexagonal so as to be clamped by a tool. A through hole 213 penetrating the connector 21 has an inner flange 214 inside thereof.
The sleeve 22 has a threaded port 220 on an end and a connection port 221 on another end thereof. An inner flange 222 is formed between the threaded port 220 and the connection port 221 inside the sleeve 22. The inner flange 222 defines a link 22a communicating the threaded port 220 and the connection port 221. The threaded port 220 serves to be threaded by the second thread 211 with a seal tape wound around the second thread 211. A ring groove 223 and at least one guiding groove 224 are formed to an inner wall of the connection port 221. A plurality of axial rib 226 is formed to an outer peripheral of the sleeve 22 to be held by a tool for handling. Instead of the rib 226, the outer peripheral of the sleeve 22 can be hexagonal.
The first seal 23 is arranged inside the threaded port 220, between the connector 21 and the inner flange 222 of the sleeve 22. The first seal 23 has a first through hole 230 penetrating two opposite sides thereof.
The plunger 24 is arranged in the through hole 213 of the connector 21. The plunger 24 includes a plug 240, a plurality of rib 241, and a spring holder 242. The plug 240 serves to close or open the first through hole 230. The ribs 241 will be received into the first through hole 230 while the plug 240 closing the first through hole 230. Rib slots 243 are formed between adjacent ribs 241. A protrusion 244 is extending from the plurality of rib 241. A spring seat 242 is formed to the plug 240 opposite to the ribs 241.

The spring 25 is an cone spring arranged inside the through hole 213 of the connector 21. The larger side of the cone spring 25 is pushing against the inner flange 214 inside the through hole 230, and the smaller side of the cone spring 25 is slid into the spring seat 242 of the plunger 24 so as to push the plunger 24 to close the first through hole 230.

The second seal 26 is received by the ring groove 223. The second seal 26 has a second through hole 260 penetrating two opposite sides thereof. The second through hole 260 is larger than the first through hole 230.

The outflow component 30 can be a faucet, shower nozzle, or triangle valve. In the preferable embodiment of the present invention, the outflow component 30 includes a buckle portion 31, seal portion 32, and push portion 33. At least one buckle 34 is formed to a peripheral of the buckle portion 31. The buckle 34 serves to be inserted into the guiding groove 224 of the sleeve 22 so as to fix the buckle portion 31 into the connection port 221. The seal portion 32 extending from the buckle portion 31 has a first cone 320, first ring ditch 321, second cone 322, and a second ring ditch 323. The first cone 320 serves to penetrate the first seal 23 so that the first ring ditch 321 is tightly received by the first through hole 230. The second cone 322 serves to penetrate the second seal 26 so that the second ring ditch 323 is tightly received by the second through hole 260. The push portion 33 extending from the seal portion 32 serves to push the plunger 24 away from the first seal 23. The end of the push portion 33 has an inlet 330 linking to the outflow component 30. The inlet 330 receives the protrusion 244 extending from the ribs 241. The inlet 330 and through hole 213 are isolated while the first through hole 230 is shut by the plunger 24. When the plunger 24 is pushed away from the first through hole 230, the inlet 330 is linked to the through hole 213 through the rib slots 243.

Figure 2:
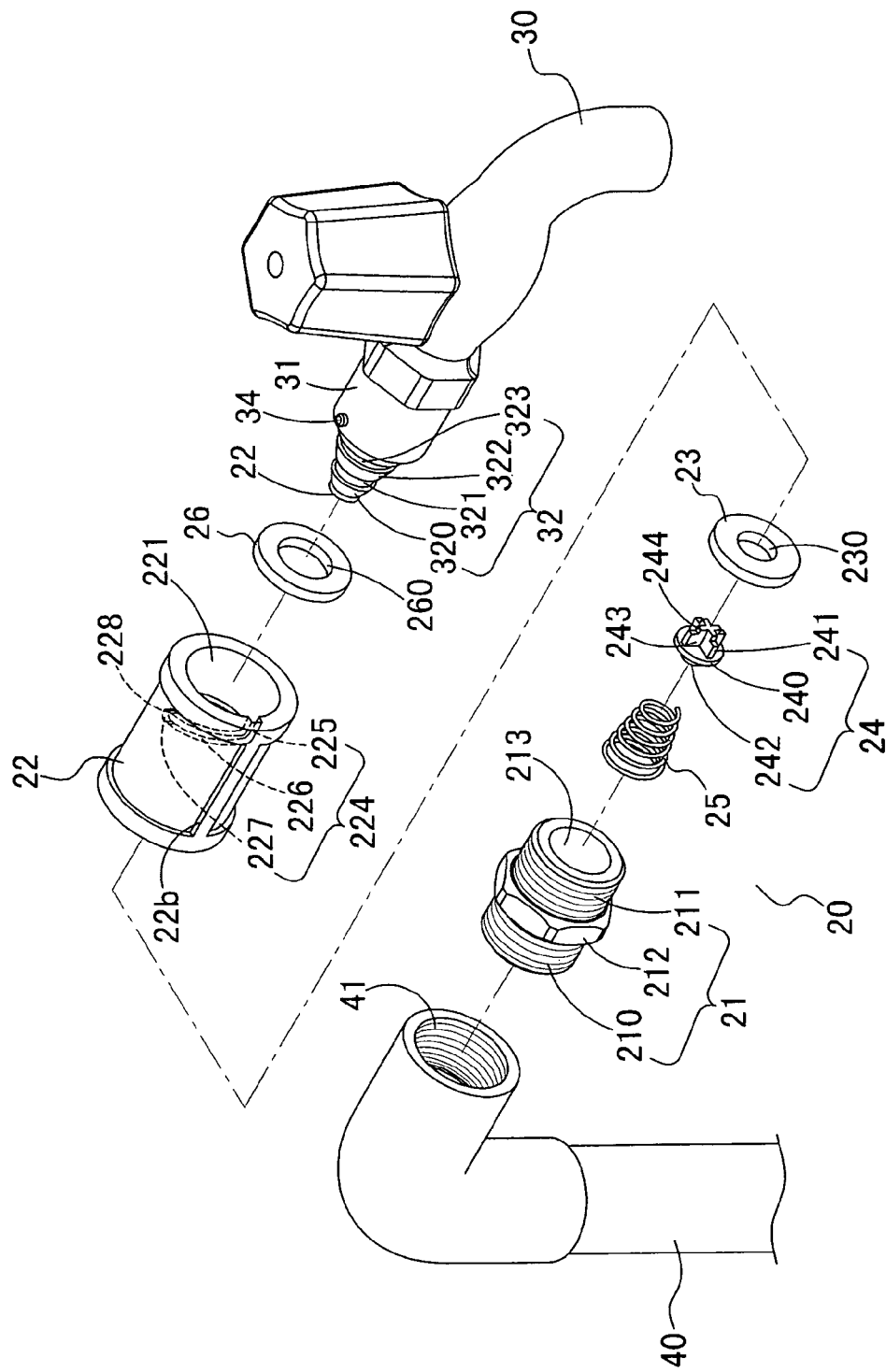
FIG. 2 is an exploded view showing a preferable embodiment of the present invention.
Figure 3:
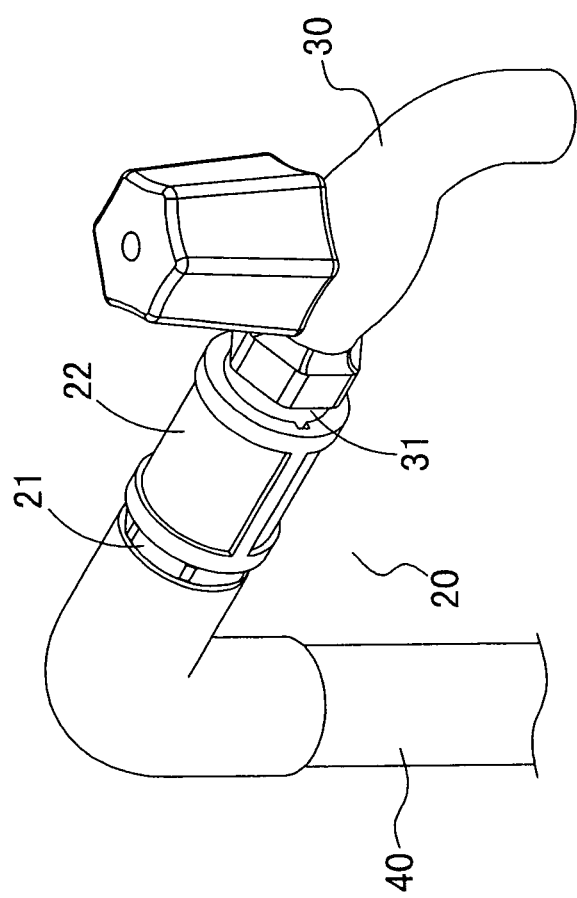
FIG. 3 is a schematic view showing the preferable embodiment of the present invention.
Figure 4:
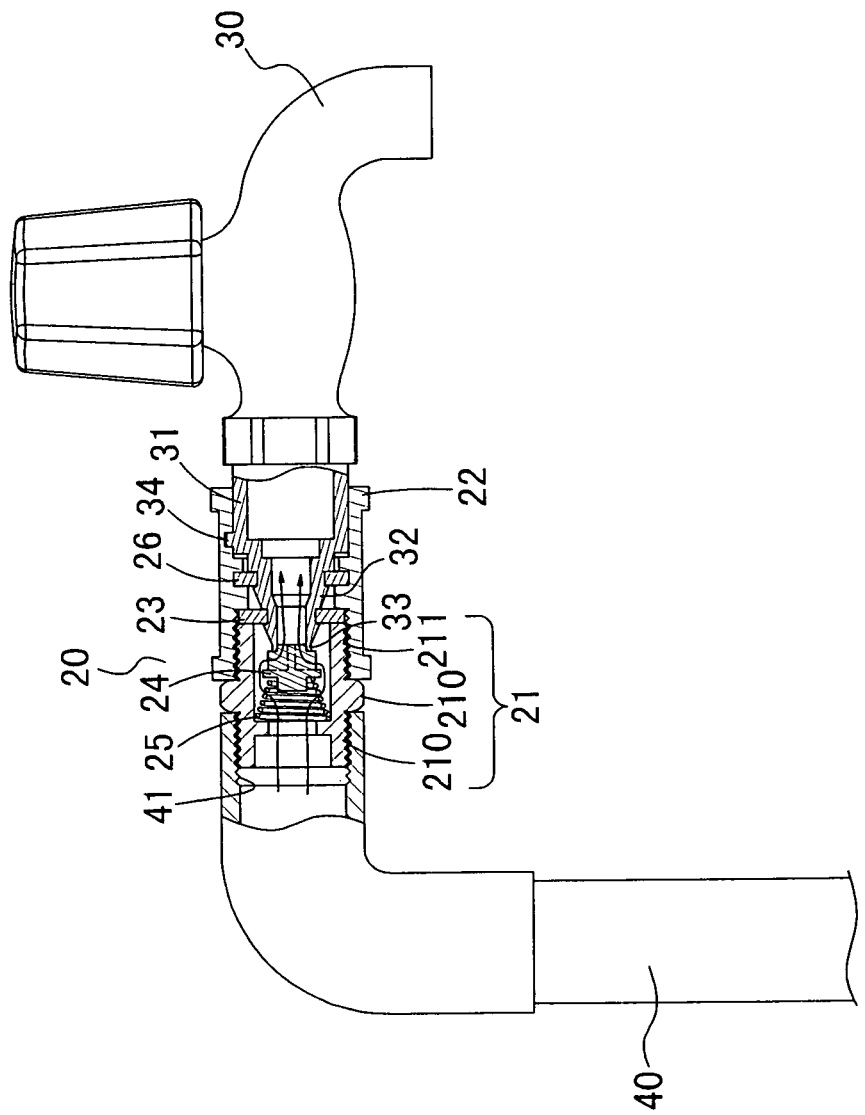
FIG. 4 is a cross-section view showing the preferable embodiment of the present invention.
Figure 5:
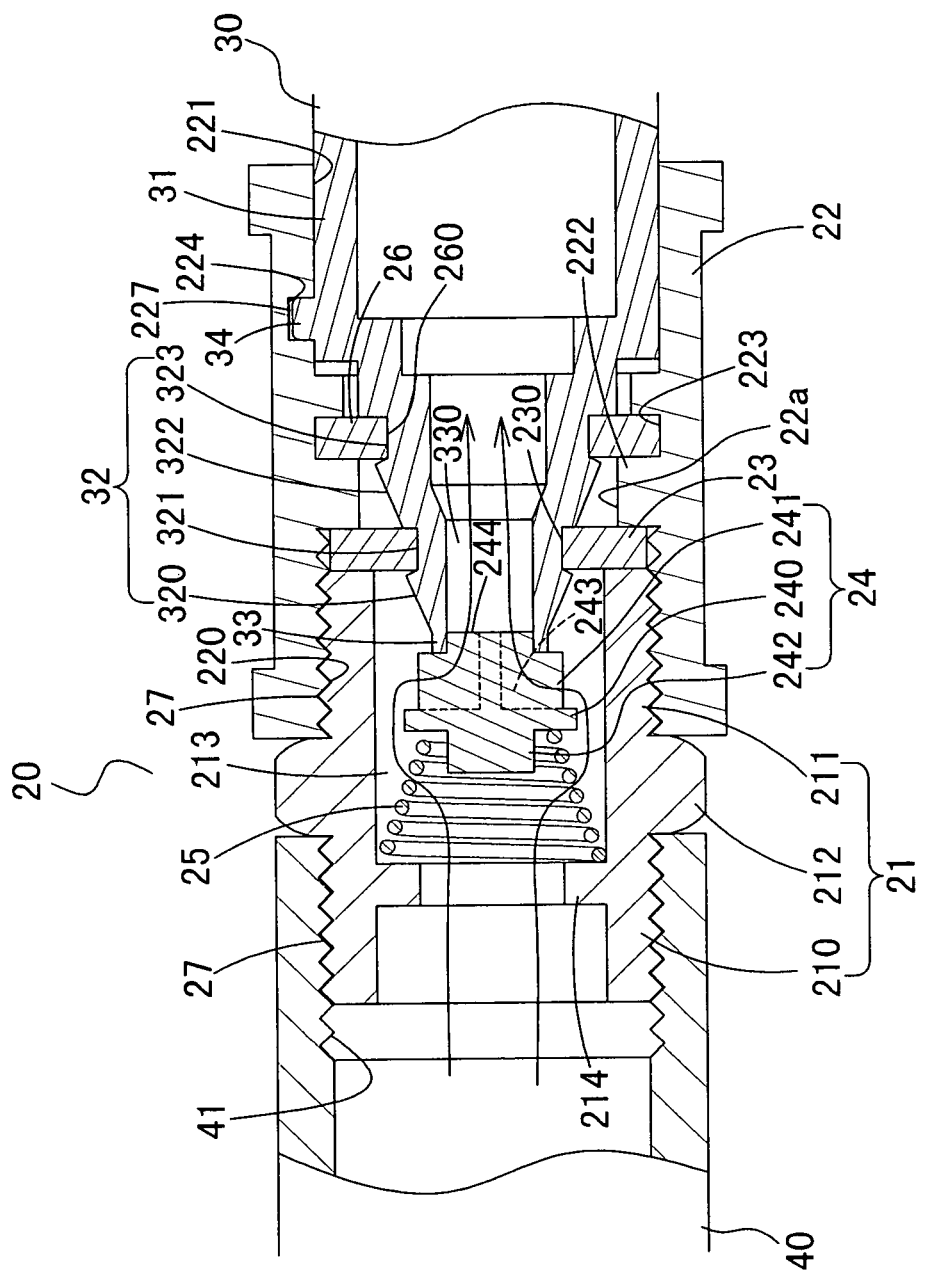
FIG. 5 is a cross-section view showing the joint of the preferable embodiment of the present invention.
Figure 6:
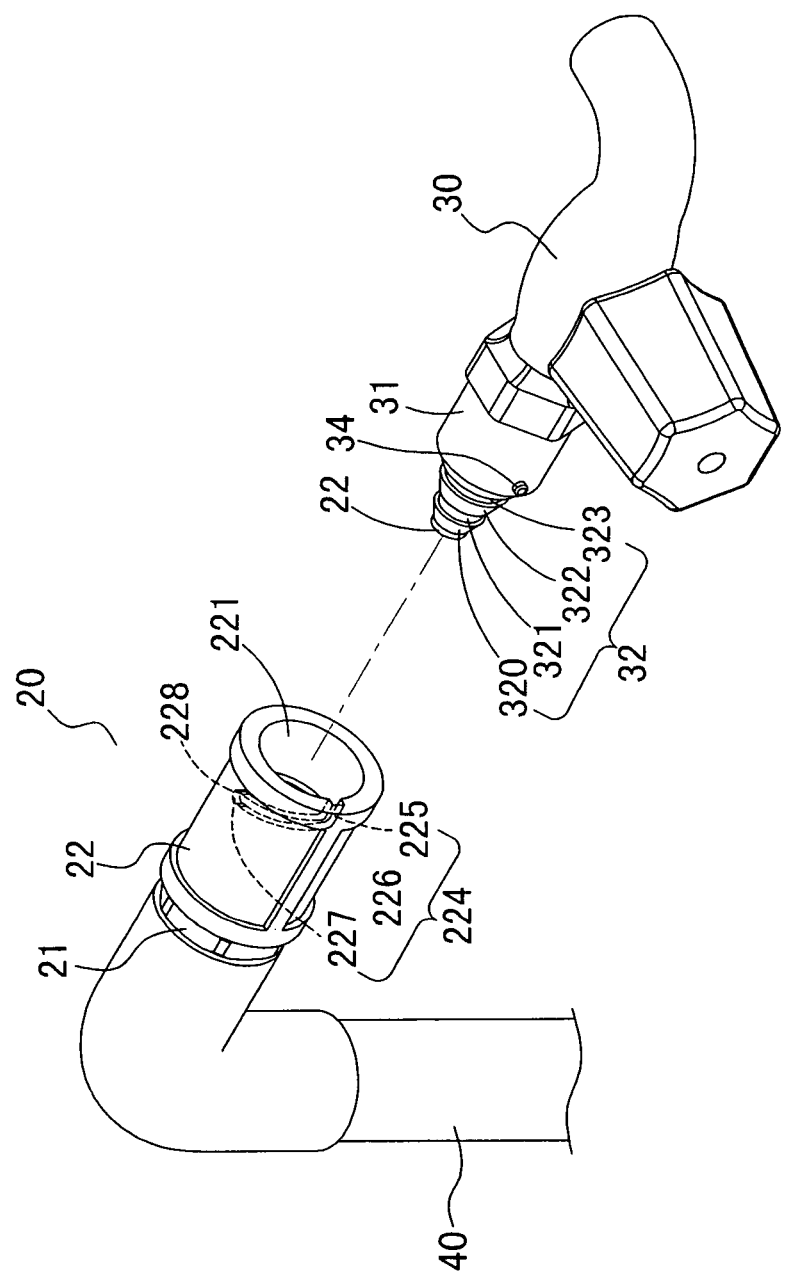
FIG. 6 is a schematic view showing the installation of the preferable embodiment of the present invention.
Figure 7:
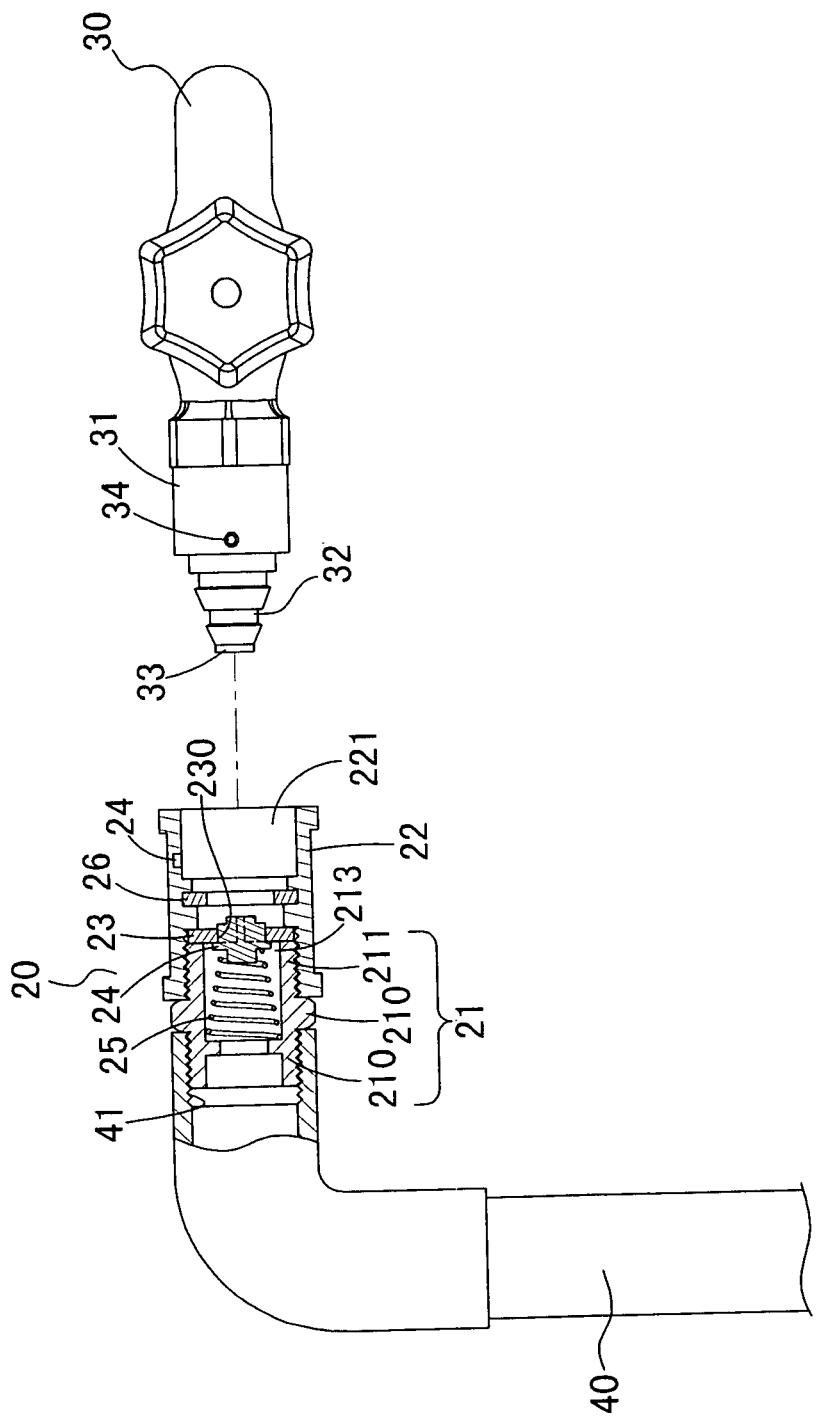
FIG. 7 is a cross-section view showing the installation of the preferable embodiment of the present invention.

Referring to FIGS. 2, 6, 7, the guiding groove 224 includes a guide-in section 225, twist section 226, and a buckle section 227. The guide-in section 225 starts from the edge of the connection port 221 to receive the buckle 34 so that the buckle portion 31 is received by the connection port 221. The buckle 34 can be slid into the twist section 226 extending from the guide-in section 225 so that the buckle portion 31 is twisted by a predetermined angle. During the buckle 34 being turned through the twist section 226, the push portion 33 will be further threaded deeper so as to push the plunger 24 away from the first through hole 230. The buckle 34 is finally received and buckled by the buckle section 227 in the end of the twist section 226 so that the buckle portion 31 can be fixed to the connection port 221. The buckle section 227 has two opposite protrusions 228 on the wall linking to the twist section 226 so that the buckle 34 in the buckle section 227 is not easily turned back into the twist section 226. Referring to FIGS. 4 to 7, while the buckle 34 is buckled to the buckle section 227, the first through hole 230 is sealed by the first ring ditch 321 and the second through hole 260 is sealed by the second ring ditch 323. During the buckle 34 sliding through the twist section 226 towards the buckle section 227, the first cone 320 will guide the first ring ditch 321 towards the first through hole 230 and the second cone 322 will guide the second ring ditch 323 towards the second through hole 260.

Moreover, the twist section 226 can be perpendicular to the guide-in section 225. When the buckle 34 is inserted into the border between the guide-in section 225 and the twist section 226, the push portion 33 will push the plunger 24 away from the first through hole 230. The first through hole 230 will be sealed by the first ring ditch 321 and the second through hole 260 will be sealed into the second ring ditch 323.

In the above embodiment of the present invention, the guiding groove 224 and the buckle 34 serve to fix the buckle portion 31 into the connection port 221.

Figure 8:
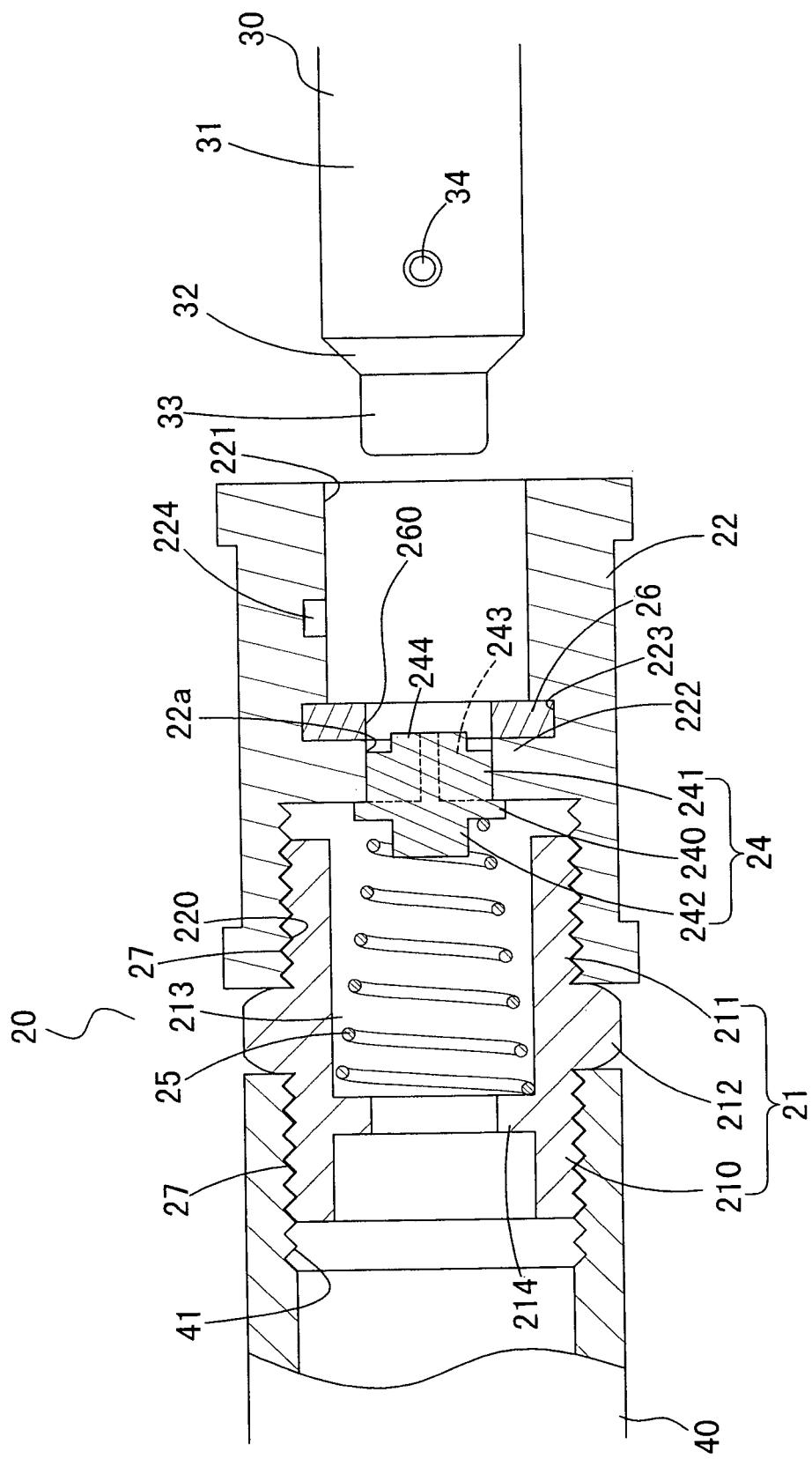
FIG. 8 is a cross-section view showing the second embodiment of the present invention.
Figure 9:
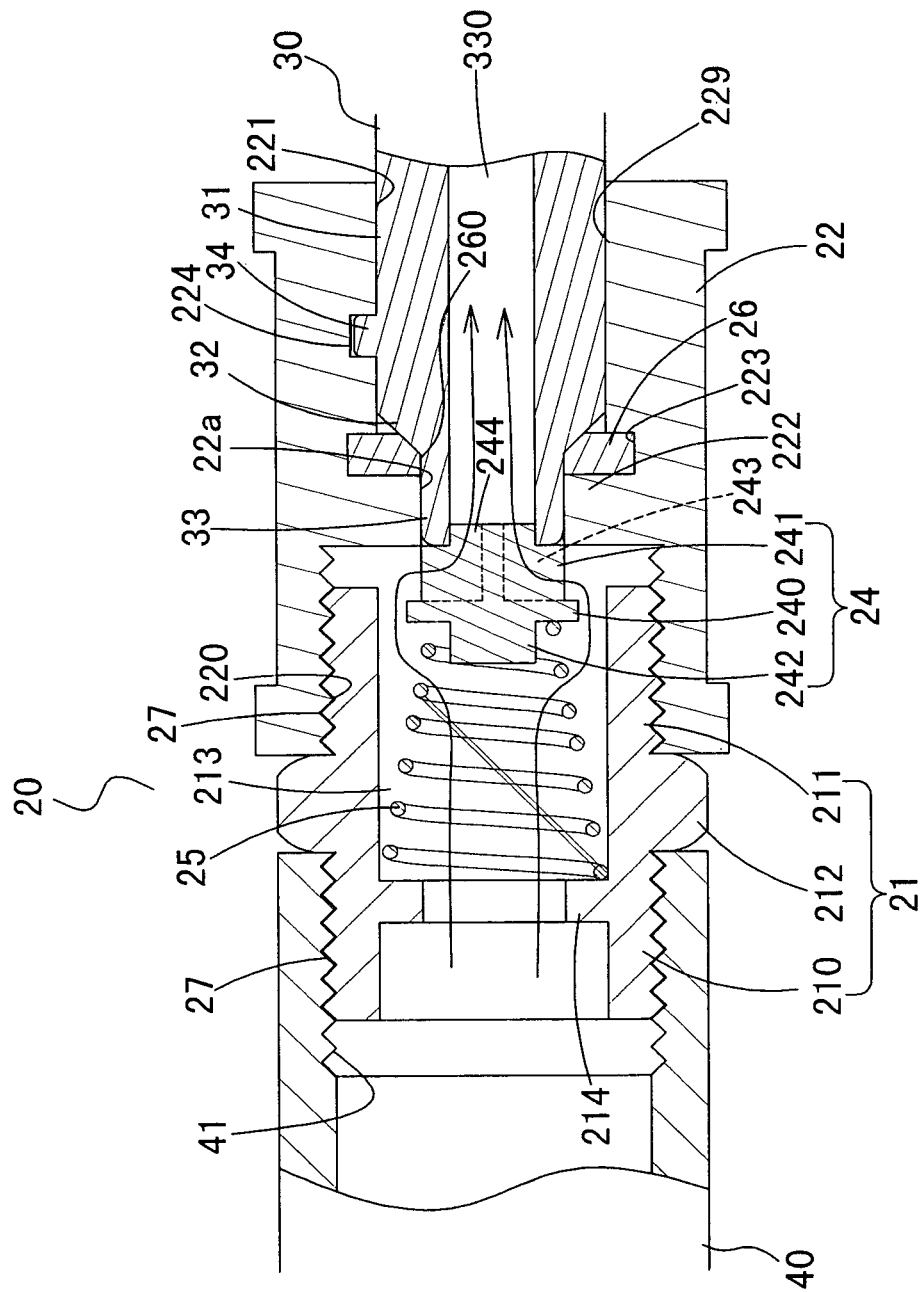
FIG. 9 is another cross-section view showing the second embodiment of the present invention.
Figure 10:
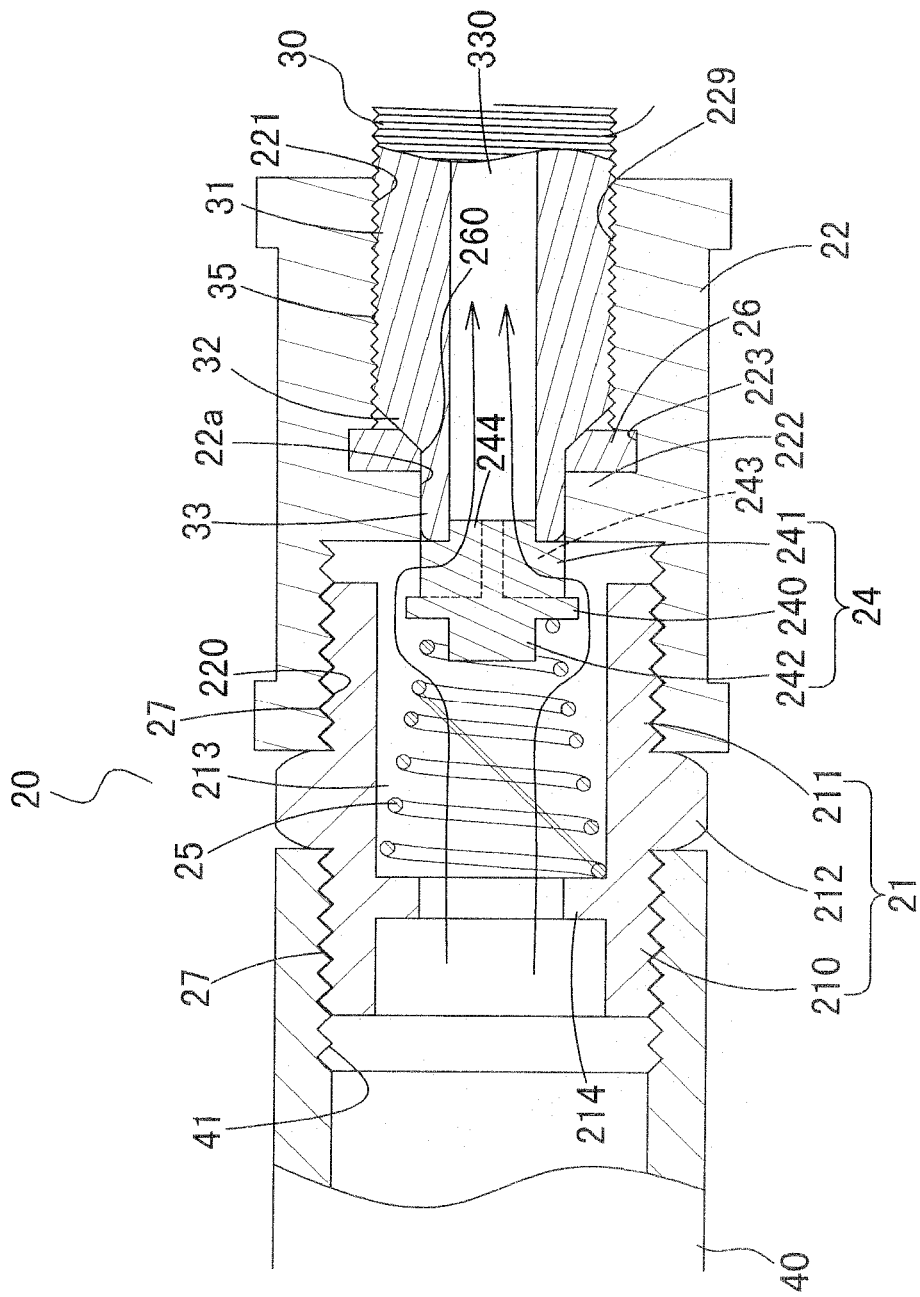
FIG. 10 is a cross-section view showing the third embodiment of the present invention.

Referring to FIGS. 8 and 9, another preferable embodiment of the present invention is illustrated. The joint 20 only has the second seal 26 in the first embodiment. The plug 240 of the plunger 24 will shut a side of the link 22a of the sleeve 20 while the plunger 24 is in the close position. When the plunger 24 is pushed away by the push portion 33, the plug 240 is away from the link 22a. The seal portion 32 is a cone serving to tightly seal the second through hole 260 when the buckle portion 31 is fixed into the connection port 221 and the plug 240 of the plunger 24 is away from the link 22a. The inlet 330 is linked to the through hole 213 through the rib slots 243 of the pushed plunger 24. Referring to FIG. 10, another embodiment of the present invention includes a connection port 221 having an inner thread 229 on the inner wall thereof. A buckle portion 31 of the outflow component 30 has an outer thread 35 on a peripheral thereof. The outer thread 35 can be threaded into the inner thread 229 so as to fix the outflow component 30 into the sleeve 22.

The joint 20 of the present invention is arranged to a water outlet 41 of the house pipe 40, and the plunger 24 will seal the first through hole 230 before the outflow component 30 is installed so that wafer will not come out from the joint 20. The plunger 24 will open the first through hole 230 while the outflow component 30 is fixed to the joint 20 so that water will flow into the outflow component 30 through the inlet 330. Through the above components, water will not spout out during the installation of the outflow component 30. There is no need to close the water regulator before the installation. Moreover, the installation of the outflow component 30 is simply inserting the buckle portion 31 into the connection port 221 and twisting it by a predetermined angle without the seal tape.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A water outflow device comprising:
   a joint having a connector, a sleeve, a plunger, and a spring; the connector having a first thread and a second thread on two opposite ends thereof; the first thread being threaded into a water outlet of a house pipe; a through hole penetrating the connector having a first inner flange inside thereof; the sleeve having a threaded port on an end and a connection port, which is linked on another end thereof; the threaded port being fixed to the second thread of the connector; the plunger being movable between a close position and an open position so as to link or isolate the through hole of the connector and the connection port of the sleeve; the spring arranged to the first inner flange of the connector pushing against the plunger to maintain the plunger at the close position;
   an outflow component having a buckle portion, a seal portion, and a push portion; the buckle portion being separably arranged to the connection port of the sleeve; a rear end of the seal portion extending from the buckle portion; the push portion extending from a front end of the seal portion having an inlet on an end thereof;
   wherein the push portion will push the plunger to the open position and the seal portion will isolate the through hole of the connector from the connection port of the sleeve while the buckle portion is arranged to the connection port; the inlet of the push portion will link to the through hole of the connector; and wherein the sleeve further includes a guiding groove formed to an inner wall of the connection port; the buckle portion of the outflow component further includes a buckle formed to a periphery thereof; the guiding groove has a guide-in section, twist section, and a buckle section; the guide-in section is formed to an edge of the connection port to receive the buckle of the buckle portion; the twist section extending from the guide-in section guides the buckle radially by a predetermined angle to the buckle section; the buckle section extending from the twist section will receive and fix the buckle so that the buckle portion is fixed to the connection port;

wherein the joint further includes a first seal (23) and a second seal (26); a second inner flange (222) is formed between the threaded port (220) and the connection port (221) inside the sleeve; the second inner flange (222) defines a link communicating the threaded port and the connection port; the first seal (23) is arranged between the end of the connector (21) and the second inner flange of the sleeve; the first seal (23) has a first through hole (230); the plunger will seal the first through hole while the plunger is in the close position, and the plunger (24) will leave the first through hole open while the plunger is in the open position; the connection port (221) has a ring groove (223) on the inner wall thereof for receiving the second seal (26); the second seal has a second through hole (260); the seal portion (32) of the outflow component (30) includes a first cone (320), a first ring ditch (321), a second cone (322), and a second ring ditch (323) formed in order from the push portion (33) towards the buckle portion (31); while the buckle portion (31) is fixed to the connection port (221), the push portion (33) will push the plunger (24) to the open position; the first through hole (230) is sealed by the first ring ditch (321) and the second through hole (260) is sealed by the second ring ditch (323); during the buckle sliding through the twist section (226) towards the buckle section (31), the first cone (320) will guide the first ring ditch (323) towards the first through hole (230) and the second cone (322) will guide the second ring ditch (323) towards the second through hole (260); and wherein the plunger (24) further includes a plug (240), a plurality of ribs (241), and a spring holder (242); the plug (240) serves to cover the first through hole (230); the plurality of ribs (241) will be received into the first through hole (230) while the plug (240) covers the first through hole (230); rib slots (243) are formed between adjacent ribs (241);

a protrusion (244) is extending from the plurality of ribs (241), the protrusion (244) is received by the inlet (330) of the push portion (33) of the outflow component (30); the inlet is linked to the through hole of the connector while the plunger (24) is pushed to the open position by the push portion (33); a spring seat (242) is formed to the plug (240) opposite the plurality of ribs (241) for arranging the spring (25).

2. The water outflow device as claimed in claim 1, wherein the twist section of the guiding groove spirals around the inner wall of the connection port by a predetermined depth; the push portion will push the plunger to the open position while the buckle of the buckle portion is twisted to the buckle section of the guiding groove along the twist section.

3. The water outflow device as claimed in claim 1, wherein the push portion will push the plunger to the open position while the buckle of the buckle portion is pushed into the twist section through the guide-in section.

4. The water outflow device as claimed in claim 1, wherein the buckle section has two opposing protrusions on a wall linking to the twist section.

5. The water outflow device as claimed in claim 1, wherein the second through hole is larger than the first through hole.

6. A water outflow device comprising:

a joint having a connector, a sleeve, a plunger, and a spring; the connector having a first thread and a second thread on two opposite ends thereof; the first thread being threaded into a water outlet of a house pipe; a through hole penetrating the connector having a first inner flange inside thereof; the sleeve having a threaded port on an end and a linked connection port on another end thereof; the threaded port being fixed to the second thread of the connector; the plunger being movable between a close position and an open position so as to link or isolate the through hole of the connector and the connection port of the sleeve; the spring arranged to the first inner flange of the connector pushing against the plunger to maintain the plunger at the close position;

an outflow component having a buckle portion, a seal portion, and a push portion; the buckle portion being separably arranged to the connection port of the sleeve; a rear end of the seal portion extending from the buckle portion; the push portion extending from a front end of the seal portion having an inlet on an end thereof;

wherein the push portion will push the plunger to the open position and the seal portion will isolate the through hole of the connector from the connection port of the sleeve while the buckle portion is arranged to the connection port; the inlet of the push portion will link to the through hole of the connector; and wherein the sleeve further includes a guiding groove formed to an inner wall of the connection port; the buckle portion of the outflow component further includes a buckle formed to a periphery thereof; the guiding groove has a guide-in section, a twist section, and a buckle section; the guide-in section is formed to an edge of the connection port to receive the buckle of the buckle portion; the twist section extending from the guide-in section guides the buckle radially by a predetermined angle to the buckle section; the buckle section extending from the twist section will receive and fix the buckle so that the buckle portion is fixed to the connection port;

wherein a second inner flange is formed between the threaded port and the connection port inside the sleeve; the second inner flange defines a link communicating the threaded port and the connection port; a plug of the plunger will shut the link in the close position; the connection port has a ring groove on the inner wall thereof for receiving a second seal; the second seal has a second through hole; the seal portion is a cone serving to tightly seal the second through hole when the buckle portion is fixed into the connection port and the plug of the plunger is pushed away from the link; and the plunger further includes the plug, a plurality of ribs, and a spring holder; the plug serves to cover the link; the plurality of ribs will be received into the link while the plug covering the link; rib slots are formed between adjacent ribs of the plurality of ribs; a protrusion is extending from the plurality of ribs, the protrusion is received by the inlet of the push portion of the outflow component; the inlet is linked to the through hole of the connector while the plunger is pushed to the open position by the push portion; the spring seat is formed to the plug oppositely to the plurality of ribs for arranging the spring.

7. The water outflow device as claimed in claim 6, wherein the twist section of the guiding groove spirals around the inner wall of the connection port by a predetermined depth; the push portion will push the plunger to the open position while the buckle of the buckle portion is twisted to the buckle section of the guiding groove along the twist section.

8. The water outflow device as claimed in claim 6, wherein the push portion will push the plunger to the open position while the buckle of the buckle portion is pushed into the twist section through the guide-in section.

9. The water outflow device as claimed in claim 6, wherein the buckle section has two opposing protrusions on a wall linking to the twist section.

10. The water outflow device as claimed in claim 6, wherein the second through hole is larger than the first through hole.

\* \* \* \* \*